(12) United States Patent
Vay

(10) Patent No.: US 6,227,825 B1
(45) Date of Patent: May 8, 2001

(54) TWO PART REED VALVE AND METHOD OF MANUFACTURING

(75) Inventor: Martin Vay, Campinas (BR)

(73) Assignee: Barnes Group Inc., Bristol, CT (US)

( * ) Notice: Subject to any disclaimer, the term of this patent is extended or adjusted under 35 U.S.C. 154(b) by 0 days.

(21) Appl. No.: 09/377,046

(22) Filed: Aug. 19, 1999

(30) Foreign Application Priority Data

Jan. 11, 1999 (BR) .................................................. 9900229

(51) Int. Cl.[7] .............................. F04B 39/10; F16K 15/16
(52) U.S. Cl. .......................... 417/569; 417/571; 137/855; 137/15.9; 29/890.129
(58) Field of Search .................................... 417/569, 571; 137/855, 15.19; 29/890.129, 890.131

(56) References Cited

U.S. PATENT DOCUMENTS

| | | |
|---|---|---|
| 1,768,830 | 7/1930 | Dansereau . |
| 2,062,206 | 11/1936 | Browne . |
| 2,899,981 | 8/1959 | Binks . |
| 2,908,287 | 10/1959 | Augustin . |
| 3,568,712 | 3/1971 | Rinehart . |
| 3,998,571 | 12/1976 | Falke . |
| 4,088,428 * | 5/1978 | Bannister et al. ................... 418/270 |
| 4,193,424 | 3/1980 | Hrabal . |
| 4,257,458 | 3/1981 | Kondo . |
| 4,406,590 | 9/1983 | Kessler . |
| 4,532,685 | 8/1985 | Itoh . |
| 4,642,037 | 2/1987 | Fritchman . |
| 4,770,058 * | 9/1988 | Lilie et al. .............................. 74/579 |
| 4,879,976 | 11/1989 | Boyesen . |
| 5,025,828 * | 6/1991 | Lin ....................................... 137/512 |
| 5,035,050 | 7/1991 | Cowen . |
| 5,060,374 * | 10/1991 | Findlanl et al. ................... 29/888.44 |
| 5,062,779 | 11/1991 | Da Costa . |
| 5,110,272 | 5/1992 | Peruzzi . |
| 5,197,867 * | 3/1993 | Kandpal ............................... 417/571 |
| 5,209,260 * | 5/1993 | Baek ..................................... 137/527 |
| 5,228,468 * | 7/1993 | Kapadia ..................................... 137/1 |
| 5,373,867 * | 12/1994 | Boyesen et al. ..................... 137/514 |

FOREIGN PATENT DOCUMENTS

| | | |
|---|---|---|
| 29 35 431 | 3/1981 | (DE) . |
| 56-60881 | 10/1979 | (JP) . |
| 62-171572 * | 7/1987 | (JP) . |

\* cited by examiner

Primary Examiner—Timothy S. Thorpe
Assistant Examiner—Timothy P. Solak
(74) Attorney, Agent, or Firm—Vickers, Daniels & Young

(57) ABSTRACT

Improved membrane valve for transferring fluids or gases in hermetic or semi-hermetic compressors, including a method and system for manufacturing a membrane valve and a membrane valve with applications for use in several motors, particularly in hermetic or semi-hermetic compressors which use, as a refrigeration fluid, an appropriate type of gas thus promoting the refrigeration physical affect. The above mentioned gas is to be transferred from one chamber to the other, according to a pre-determined frequency, when utilized in conjunction with a piston. A body and a membrane are produced from substantially thin metallic plates separately in accordance to an available process and subjected to rounding in order to eliminate live corners, and then juxtaposed thus composing the valve, with the above mentioned membrane on one side, fitted to the body which is fixed through a connection process and, on the other side, left free to oscillate, thus allowing the passage of a fluid such as a refrigeration gas.

20 Claims, 5 Drawing Sheets

TWO PART REED VALVE AND METHOD OF MANUFACTURING

BACKGROUND OF THE INVENTION

A membrane valve used more often in the area of refrigeration, and notably used in hermetic and/or semi-hermetic compressors which use an appropriate gas thus promoting the refrigeration effect is provided, allowing the above mentioned gas to be transferred from one chamber to the other, according to a pre-determined frequency as illustrated in FIGS. 1 and 2, when utilized in conjunction with a piston.

At the present moment, there exists an extensive variety of membrane valves, generally made of high carbon or stainless steel which, although presenting several manufacturing variations, have a common feature, a manufacturing process of stamping followed by tumbling, resulting, as illustrated in FIG. 9, in a monolithic structure, or a single part (A).

In a first manufacturing concept, a single part (A), generally made from a substantially thin metallic plate, a series of openings are produced, which externally define holes (B), with diverse functions, with at least one of such holes destined to the exhaust valve and the rest to the locking in place and assembly of the valve on the body of the head of a specific compressor and, internally defines, at least one cut or elongated opening (C1), which basically extends itself around the internal side of the body (A), defining at least one membrane (C), in FIG. 9, of any shape as in the tear-shaped example. Then, the body (A), which takes on the functions previously mentioned above, and at least one membrane, is subjected to an operation of rounding the corners by stamping, in-such a way as to avoid the concentration of tension points and the consequent formation of cracks upon operation.

As such, according to the first concept of the manufacturing process pertaining to the state of the method, the membrane valve is defined by at least one cut or elongated opening in a single part (A), in such a way that the membrane (C) continues to integrate the part (A) after punching, and thus presenting a series of disadvantages, as explained in the details to follow.

Generically, in regards to the dynamics of the operation, the membrane valves are comprised of an external section to be attached to the housing of the body of a compressor and at least one internal sections (membrane or reed) free to move (oscillate) in relation to the first sections and positioned over an area which is the intermediate point between the fluid entry duct and a suction chamber and which transfers such fluid to a chamber equally furnished with an exhaust valve. In this manner, at least one of the above mentioned central sections oscillates in accordance to the behavior of the said chamber and, in this condition, the exhaust valve is closed. In a following stage, where the fluid is compressed into the chamber, the membrane valve closes, while the exhaust valve is opened thus transferring the fluid to another duct, with the piston of a hermetic compressor providing the suction and transfer functions.

To satisfactorily execute the sequence of the operations described above, the membrane valves require certain manufacturing characteristics which, when present in larger numbers, are more adequate for its operation.

The first of such characteristics is the existence of the smallest possible radial gap (E) between each elongated opening and its respective membrane, basically around the central section of the body (A), in such a way that, from one side, it allows for freedom of movement of the membrane and, from the other side, little or no gas is retained around it, but is effectively transferred from one chamber to the other. Although the volume, which is usually filled by gas between the membrane and the rest of the body, is relatively small, considering that the body (A) is generally made of a substantially thin plate and, consequently, the quantity of gas stored within it is also a small amount, but, upon multiplying the same quantity of gas by the frequency of the typical operation of a medium size compressor of around 3,600 oscillations per minute, the quantity of the undesirably stored gas becomes considerable, causing a negative result on the efficiency of the assembly's operation, for the gas retained in it does not refrigerate. This situation becomes even more complicated in the case of semi-hermetic compressors, for in these, the oscillation of the reeds are considerably faster, mainly due to the fact that such type of compressor is widely used in several vehicles, in which the rotation is variable and may easily go over the 10,000 RPM range. In existing membrane valves, it is not always possible to obtain a reduced gap (E) between the membrane and the rest of the body for, according to its manufacturing process, it is necessary that a stamping (puncturing) tool be manufactured with reasonable resistance and thickness, which causes the production of a radial gap (E) of around at least 3 times the thickness of the plate.

Another desirable characteristic in this type of valve is the presence of corners which are softened or rounded at the edges of the body (A) and of the membrane (C) at the extension of the gap (E), in order to avoid tension accumulation due to frequent axial flexing of the membrane (C) during operation. Even if the radial gap (E) is somewhat elevated, as explained above, these edges do not present satisfactory softening after being tumbled in a barrel, for the abrasive necessary for the tumbling cannot satisfactory penetrate the gap (E), resulting in a less desirable finishing.

A third and last desirable aspect is the low cost of this type of valve, considering that it is part of a highly competitive market segment. It can be noticed from the operation described here, that the membrane (C) is the most frequently used part of the valve (A) and therefore, would need to be build out of a superior material, the opposite of the rest of the body (D); which acts solely as an assembly support and/or spacer and could be build of less expensive materials. However, considering that this manufacturing concept is based on the stamping of the valve into a single part, all of it should, therefore, be made of a superior, expensive material, even for the parts not subjected to great mechanical use.

In order to solve the above-mentioned problems the technical condition includes different processes, all of which were created so that the membrane valve is manufactured in two distinct parts, such as described in the Brazilian document PI 9.604.645-7 of Dec. 3, 1996, "PROCESS FOR THE MANUFACTURING OF A MEMBRANE VALVE FOR THE TRANSFERRING OF FLUIDS AND A MEMBRANE VALVE", with its construction, as per the illustration of FIG. 8, elaborated to handle different objectives, among which are highlighted:

1. the creation of a membrane valve in two distinct parts, one making up the body or part (D) and the other making up the reed (C) with both parts, however, kept together by an adhesive tape (F);
2. the radial gap (E) between the corresponding edges of the two parts is substantially reduced to less than 3 times the thickness of the thin plate used in the body (D), and may be at least 0.05 mm, favoring the compressor's output, since the quantity of gas retained in the gap is insignificant;

3. the increase of the service life of the puncturing tools used in the construction of the bodies (C) and (D), and especially the opening (C1), for punctures, which are more resistant than the ones on thin walls typical of the previous technique, may be used;

4. reduction of the cost of valve manufacturing for it becomes possible to use expensive materials only in the main parts or reed (C);

5. improves the service life of the valve in question, due to the increase of its wear resistance, created by the integral rounding of all the related corners, for the part (C) will have perfect corners for the abrasive may reach them adequately;

6. increases the versatility of the process, allowing for investment reduction in raw material stocking and speeding up production, due to the versatility of the assembly obtained from standardizing one single body (D) which will receive different types of membranes (C), defined in accordance to the technical needs of each project;

7. independently from the material used for the body and the reed, both are kept together (pre-assembled) by adhesive tape (F), applied in one of the faces of the assembly, where another tape should also be applied in order to balance the thickness of the first tape.

Although the technology described in the Brazilian document PI 9.604.645-7 has solved all the problems previously cited, it also generated another problem, related only to the pre-assembly between the body and the reed, for, as previously mentioned, the fixation of the two parts is made from using adhesive tapes, which will remain on the part permanently, that is, it will not be removed at the time of the final compressor assembly, and, therefore, cause some inconveniences, beginning with the presence of the actual tape; that is, although its thickness is very small, it considerably augments the thickness of the assembly, with the non standard part of such thickness concentrated in a certain area, and, therefore increasing the thickness of the total assembly and thus negatively interfering on the seal between the assembly components of the compressor's head. On the other hand, the adhesive tape is a product which includes different chemical components, where the more aggressive ones are used to form the adhesive part and, because of this, such chemical products will eventually damage parts of the actual compressor's head of the membrane, and may interfere in the operation, for instance by obstructing the capillary duct causing total failure of the compressor, for, as it was previously mentioned the reed (C) and the body (D) may be manufactured from different materials thus, by using the adhesive tape, it is necessary to have a rigorous quality control and testing for each material used, but still, the inconvenient increasing of thickness at a certain section persisted. Thus, for the manufacturing of the membrane valve, the ideal process would be manufacturing the valve from different materials, one for the reed and another for the body.

It would also be ideal for the two parts, reed and body, to be kept together. This condition has the purpose to speed up the process of the compressor's final assembly, eliminating the operations of selecting the reed and the body, as well as the alignment among both parts and in the assembly line. Although both parts are manufactured from different materials, they would be treated as a single part, this would speed up the final stage of the compressor's assembly. For this reason, the ideal condition would also be that the joining of the reed and the body be made without the use of additional material added to the assembly and without causing the increasing of the thickness. On the other hand, it would also be ideal for both parts, reed and body, to remain together and perfectly aligned and in the proper position for the final stage of the compressor's assembly.

In U.S. Pat. No. 5,140,748 of Aug. 25, 1992 "MANUFACTURING PROCESS OF A VALVE ASSEMBLY FOR A RECIPROCATING PISTON COMPRESSOR AND THE RESPECTIVE COMPRESSOR", there is a description of a certain technology to allow the adjustment between the reed and the body of the membrane valve. This adjustment, mainly, consists of providing mediums as shown in FIG. 10, so that the reed may be perfectly aligned to the opening corresponding to the valve's body. These mediums, in reality, become an integral part of the compressor's head and are presented in the form of 128 type pins, while the reed and the body will have in the adjacent edges 124–126 cuts which, combined amongst themselves, form or configure mediums to fit the said pins (128), and in such manner, finalizing the necessary resources for the correct alignment between the reed (C) and the valve's body (D). Logically, all these operations are performed at the time of assembly of the compressor's head. Such technical solution, as previously mentioned, will solve the alignment problem between the parts that form the membrane valve, but still, the selection of the two parts should be made at the assembly line, and it becomes extremely complicated when the said components are manufactured from different materials, and even more complicated when different membrane valves are used at the same assembly line. Hence, the technical solution proposed in U.S. Pat. No. 5,140,748 presents substantially high costs and the considerable complexity for manufacturing the assembly, for, besides positioning two items during the assembly, there is also the positioning pins which, in several occasions, cannot be fitted in the compressor's head.

SUMMARY OF THE INVENTION

In accordance with the present invention, an improved membrane valve for transferring fluids or gases in hermetic or semi-hermetic compressors, as well as a method and system for manufacturing the same are provided, maintaining the same characteristics and advantages described in the Brazilian document PI 9.604.645-7 of Dec. 3, 1996, using a stage of the process which eliminates the adhesive tape (F) shown in FIG. 8 thus, in this condition, eliminating all problems caused by the latter.

It is accordingly a primary objective of the invention to foresee an efficient method so that the two parts, here called reed or membrane and body, may be kept together and properly preassembled (which cannot be lost).

It is another objective of the invention to foresee a way to join both parts without interfering with their quality and technical characteristics, especially on what refers to their flat aspect, that is without augmenting its thickness.

Still another objective of the invention is to foresee a way to join both parts without interfering with the hardness, mechanical resistance and flexibility of any one of the parts, herein known as body (D) and membrane or reed (C).

A further objective of the invention is to foresee a joining medium which can become an integral part of the two parts, that is, will not form a residual part which will eventually have to be removed or which eventually may settle in inappropriate sections of the two parts.

Another objective of the invention is to foresee an inert joining medium, one that does not react with the parts of the membrane valve or with the parts that form the head of the compressor.

Yet another objective of the invention is to foresee a joining medium which can be done automatically, significantly lowering the final product cost; and Still another objective of the invention is to guard the possibility of using a less expensive material to manufacture the body of the valve, considerably reducing its manufacturing cost.

In addition to the objectives mentioned above, this invention also presents some of the advantages of the previous process: a) to present a smaller radial gap between each elongated cut and the respective membrane defined by such cut, aiming to maximize the refrigeration effect supplied to a certain compressor, thus minimizing the quantity of gas generally retained between the membrane and the rest of the valve's body; b) to provide a valve with all corners softened or rounded in order to avoid tension accumulation of the membrane being used, allowing for a longer service life; c) to present more manufacturing and assembly versatility, thus allowing the work to be made with a reduced stock of raw material and finished parts, which can, at the same time, meet the modem standards of production such as the "just in time" standard; d) to provide a membrane valve with a technical performance substantially more advantageous than other existing valves, due to a better selection of manufacturing materials which increases its yield.

BRIEF DESCRIPTION OF THE SEVERAL VIEWS OF THE DRAWINGS

In order to allow for a better understanding of the said invention, the following is a detailed description with references to the attached drawings where.

DETAILED DESCRIPTION OF THE INVENTION

Figure 1:
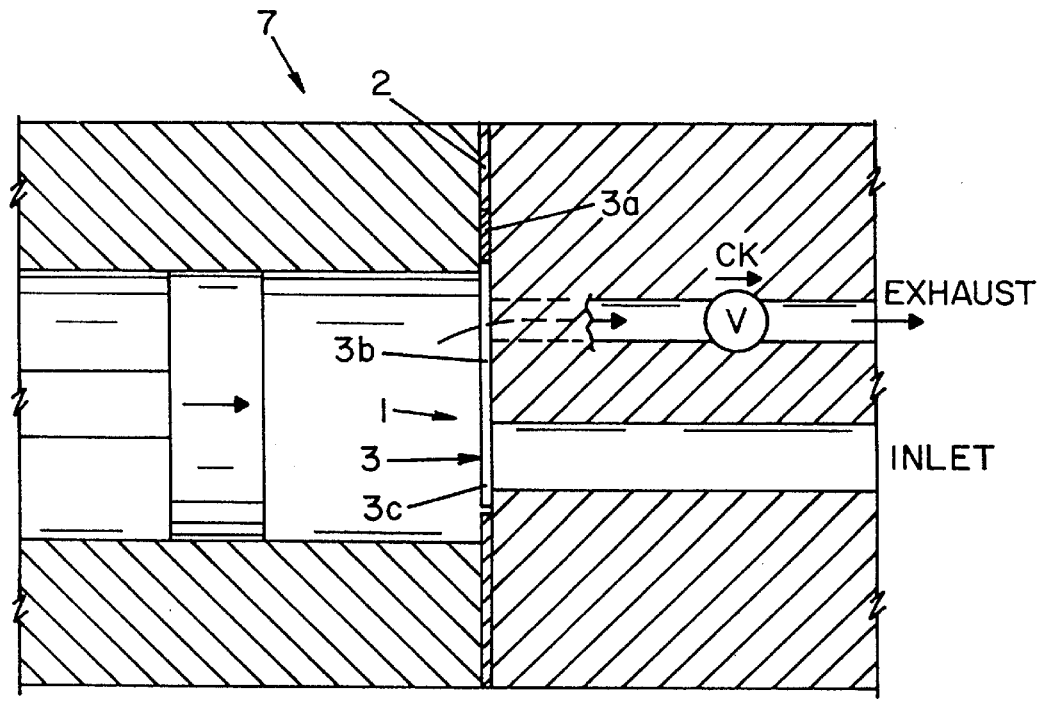
FIGS. 1 and 2 are schematic views of a refrigeration compressor, highlighting the use of a membrane valve.
Figure 2:
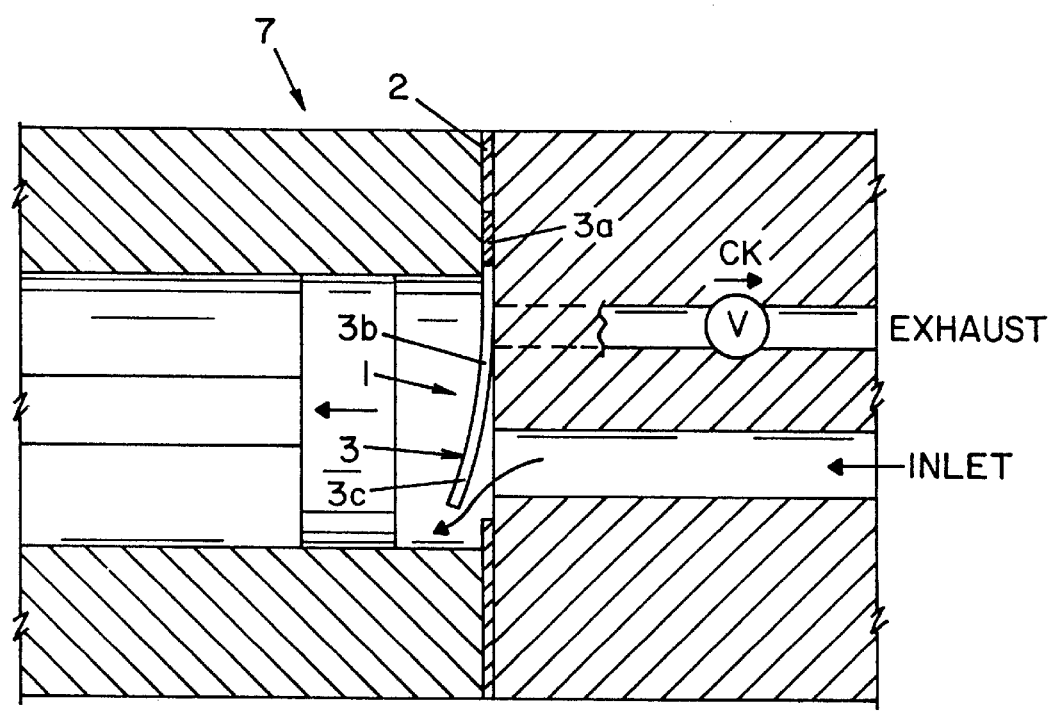
Figure 6:
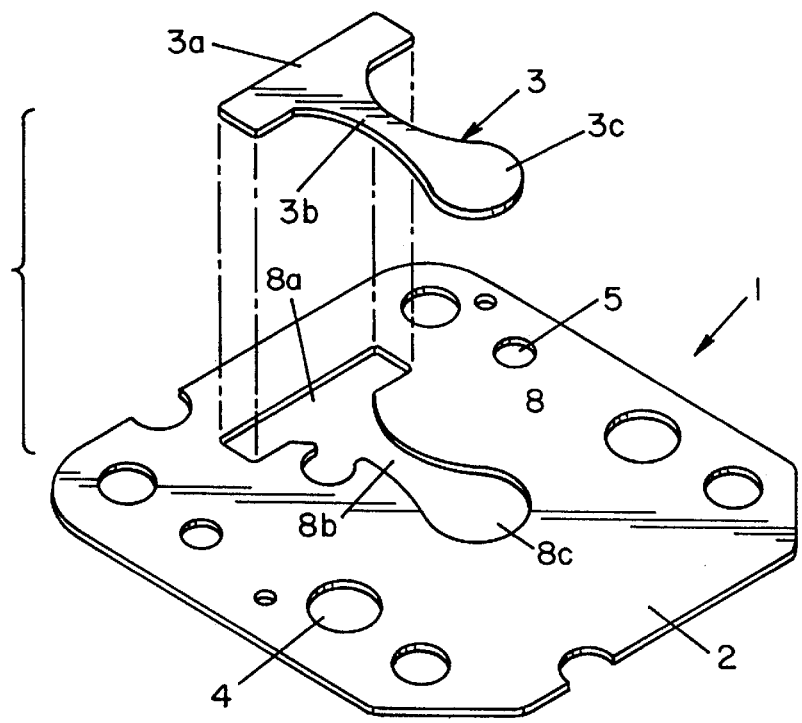
FIG. 6 shows a perspective exploded view like the one showed in FIG. 8, but without the joining mediums between the body and the reed.

In accordance to these illustrations and its details, the present invention may be applied to membrane valves (1) with different configurations, such as the one shown in FIG. 6, by which one can verify that the valve is composed of a body (2) made of a substantially thin metallic plate of a certain material which has, at its outermost radial area, at least one hole (5) configuring the lodging for the usual escape valve and several holes (4) for the assembly of the valve (1) on a determined compressor (7), such as the one shown in FIG. 1, and, at its innermost radial area, at least one polygonal transferring opening (8) limited by the rest of the body (2) by a continuous internal edge and defining a base (8a), shown here as a type of an inverted "T", with a narrowed section in the middle (8b) as it relates to a substantially disk type terminal (8c), defined by a drop type polygon, in which a second body or membrane (3) is lodged in order to fit the polygonal opening (8), using the fittings from base (3a) to base (8a), from the middle section (3b) to section (8b) and of terminal (3c) to vertex (8c), leaving the terminal (3c) axially free to allow the passage of gas (not shown) during the operation. The transferring opening (8) will only be deburred, for its not necessary to round this opening since this part of the valve is not used mechanically.

Figure 3:
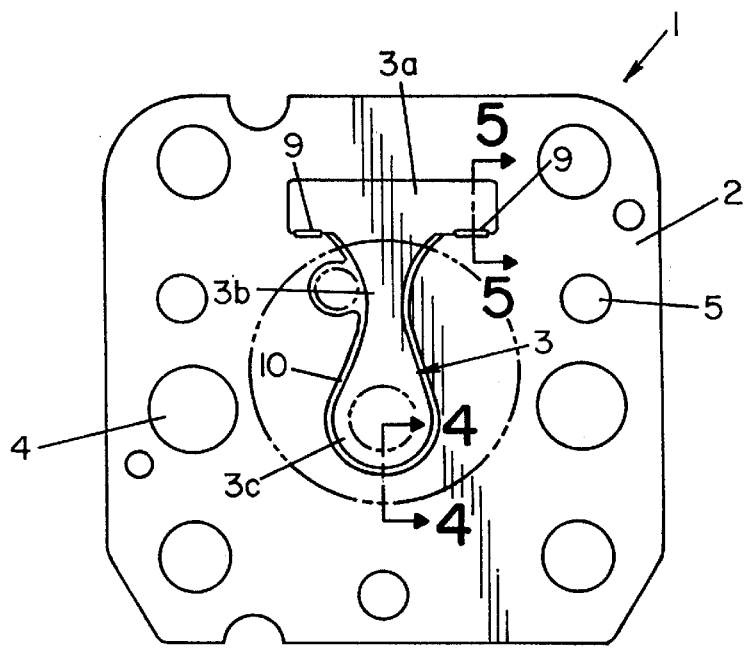
FIGS. 3, 4, and 5 are views which highlight the details obtained from this improvement, all of them targeted on the joining between the body and the reed.
Figure 5:
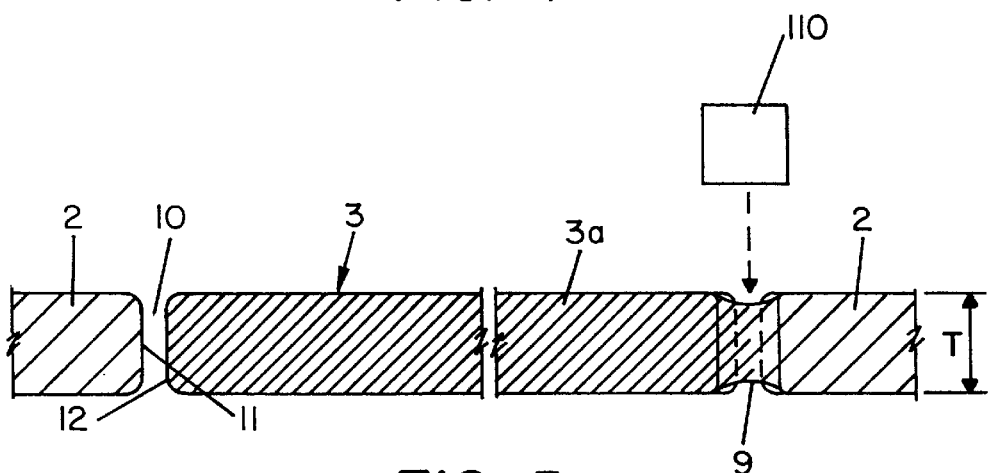

In accordance to the Brazilian document in reference, the manufacturing process for the valve mentioned above is comprised of the following essential stages:

a. to provide a body (2), with at least one hole (5) at its outermost radial section defining an opening for the lodging of the escape valve and several holes (4) to guide the assemblage and fix the assembly to a determined compressor (7) and, at its innermost radial section, at least one polygonal transferring opening (8) limited by the rest of the body (2) by a continuous internal edge and defining a base (8a), a middle section (8b) and a terminal (8c);

b. provide a second body or membrane (3), with a peripheral border which defines the base (3a), a middle section (3b) and a terminal (3c) which are linked with the polygonal opening (8) of the first body (2);

c. provide the softening of the edges of the reed (3) in order to integrally round them;

d. juxtapose the membrane (3) to the polygonal opening (8) of the first body (2) by the fitting of base (3a) to base (8a);

e. as illustrated in FIGS. 3 and 5, the improvement in question, in characterized by the inclusion of a stage of permanent and irreversible joining between the body (2) and the reed or membrane (3), upon application of a joining medium (9) inlaid in the interior of the gap's groove (10) created between the two parts previously aligned and fitted between themselves, with such joining occurring at the facing sides (11–12) of both parts (2) and (3).

The above mentioned joining medium (9) extends along the groove (10) but, only at a section between the perimeter defined by base (3a) and ending before the flaming transversal point or line of the reed or membrane (3).

As illustrated in FIG. 3, the above mentioned joining medium (9) may present itself in the form of one or more points distributed along the perimeter of the reed's (3) base (3a), preferably two opposing points.

The above mentioned joining medium (9) should preferably be made from laser welding using laser 110, brazing, gluing or the equivalent.

When the joining medium (9) is made from a laser weld, there is no additional material used for joining the parts, for this is accomplished by the fusion of the facing edges (11–12), thus provoking the drainage of the melted material inside the groove (10), forming a linking bridge between the external side (2) and the reed (3).

The above mentioned joining medium (9) may be a type of glue, resin or any other substance, but, with sufficient characteristics and viscosity to be fitted in the interior of the groove (10) and to establish a rigid link between the two facing sides (11–12) of parts (2) and (3).

Figure 4:
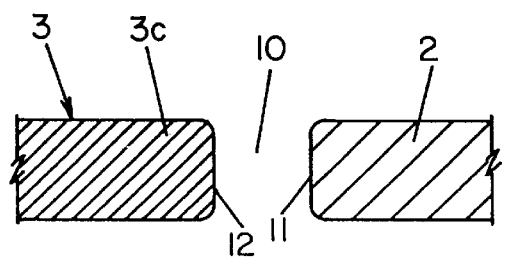

In reference to FIGS. 3, 4 and 5, the above mentioned joining medium (9), after being applied, whether by soldering or by gluing, should be of a thickness inferior to that of the valve (1), as well as the superior and inferior surfaces of the joining medium should be dephased inward in relation to the corresponding surfaces of the body (2) and of the reed (3).

Following the above mentioned information and illustration, it can be noted that the current improvement can be used in different suction valves for hermetic or semi-hermetic compressors used in domestic or commercial refrigeration systems, including different automotive or non-automotive air-conditioning units.

Figure 7:
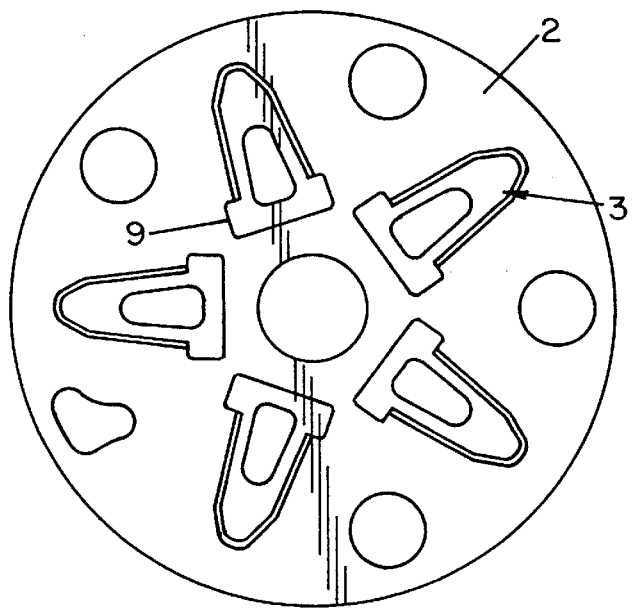
FIG. 7 shows an example of a suction valve typically used in automotive air conditioning compressors.
Figure 8:
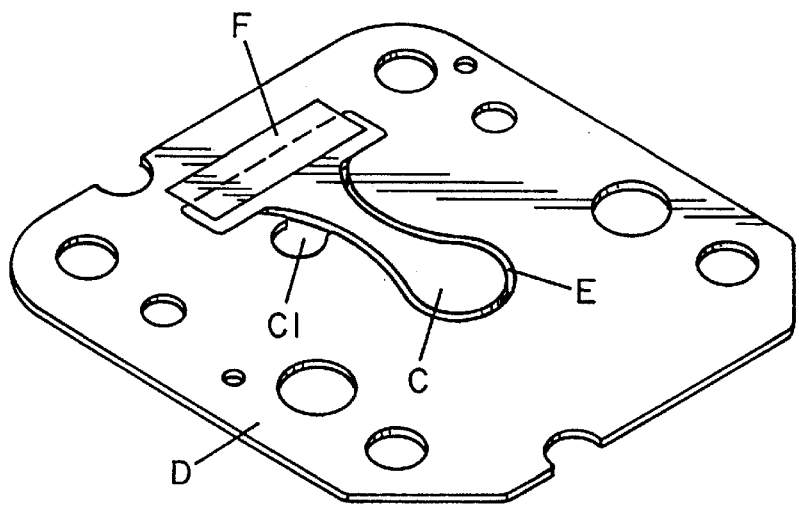
FIG. 8 shows a perspective exploded view of valve manufactured in accordance to the process described in the Brazilian document PI 960645-7.
Figure 9:
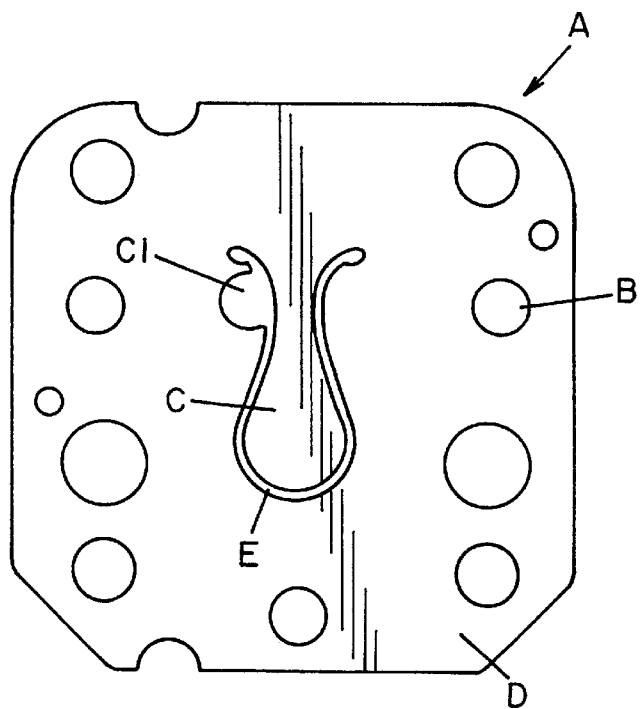
FIG. 9 represents a plan view of a conventional valve.
Figure 10:
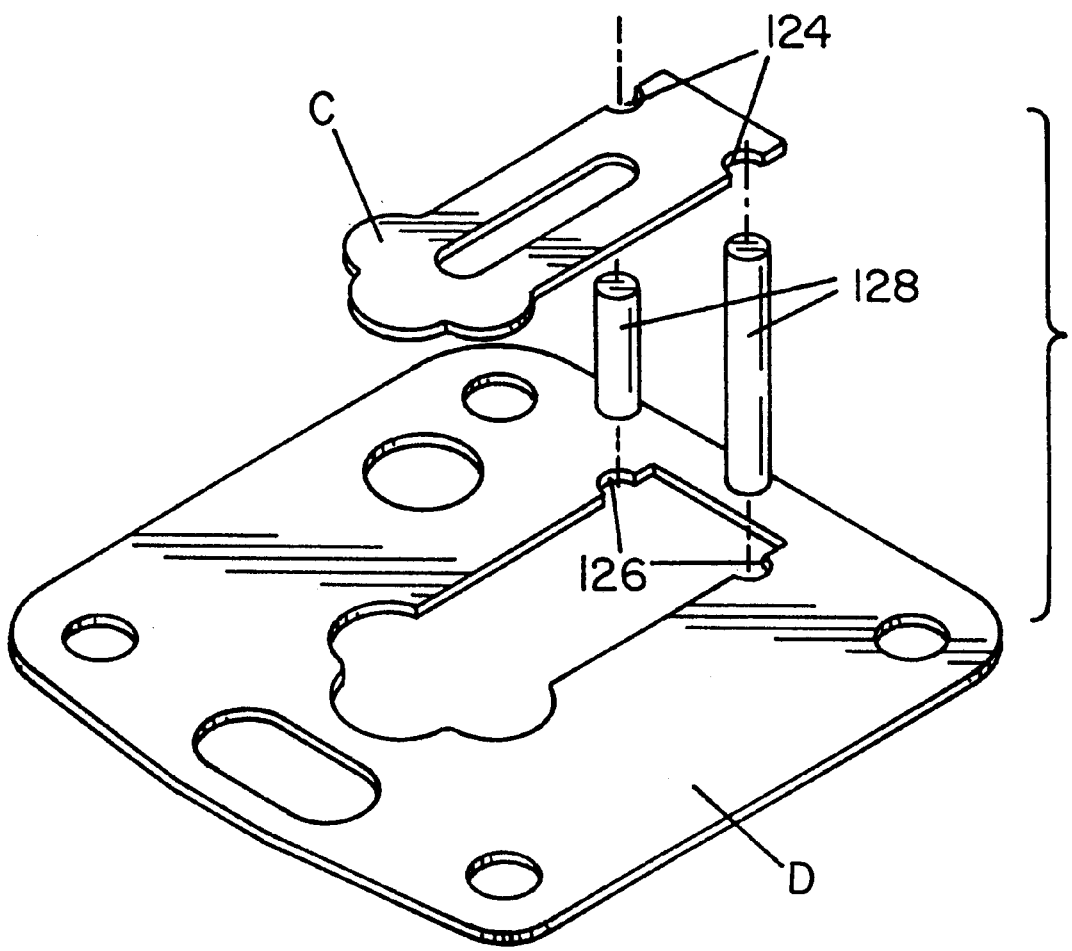
FIG. 10 shows a perspective view in accordance to the process described in U.S. Pat. No. 5,140,748.

FIG. 7 shows only as an example a suction valve which is typically used in automotive air conditioning compressors. In this case, the valve has several membranes (3) and a circular body or external part, but, its main operation and assembly is the same in relation to the valve illustrated in the previous FIGURES. In this manner, the current improvement can be equally applied, with the same advantages.

With the process being questioned, the membrane valve (1) presents the following advantages in relation to the other existing valves;

a. cost reduction: by using less expensive materials for the external part (2), less punctures due to faster rounding of the corners of the part, for the external part (2) may now be only deburred;

b. increase of service life of the part for two reasons: the perfect rounding of the corners and the possible use of more expensive materials being used to manufacture the reed;

c. better compressor efficiency, since the dead volume of the gap (E) may be lessened;

d. to allow the joining of the two parts (2–3) without interfering with their quality and technical characteristics, especially on what refers to their flat aspect, that is without augmenting its thickness;

e. to allow the joining of the two parts without interfering with the hardness, mechanical resistance and flexibility of any one of the parts, herein known as body (2) and reed (3);

f. the joining mediums will become an integral part of the two parts, that is, will not form a residual part which will eventually have to be removed or which eventually may settle in inappropriate sections of the two parts;

g. the joining mediums do not react with the parts of the membrane valve or with the parts which form the head of the compressor;

h. the joining of the parts can be done automatically, which can lower the final cost of the product even more;

i. a smaller radial gap between each elongated cut and the respective membrane defined by such cut, aiming to maximize the refrigeration effect supplied to a certain compressor, thus minimizing the quantity of gas generally retained between the membrane and the rest of the valve's body;

j. presents more manufacturing and assembly versatility, thus allowing the work to be made with a reduced stock of raw material and finished parts, which can, at the same time, meet the modem standards of production such as the "just in time" standard;

k. presents technical performance more advantageous than other existing valves, due to a better selection of manufacturing materials which increases its yield; and l. the improvement may be used with the same advantages in both hermetic or semi-hermetic compressors.

Having thus described the invention, the following is claimed:

1. A method for manufacturing a membrane valve for installation between mating surfaces of a cylinder block containing a cylinder and a valve head of a compressor for allowing uni-directional flow of fluids between said cylinder and said valve head, comprising the steps of:

a. forming a planar body of a maximum thickness "T" with an opening defined by a continuous internal edge, said opening having first and second, axially spaced opposite ends such that a longitudinal axis of said opening extends between said first and second ends, b. forming a planar membrane of maximum thickness "T" with a peripheral edge corresponding to said continuous internal edge of said body, c. positioning said planar membrane within said opening of said planar body in coplanar relationship with said body so that said peripheral edge of said planar membrane and said continuous internal edge of said body define a gap extending peripherally therebetween, and d. flowing a joining medium across a portion of said gap near said first end to attach a portion of said peripheral edge of said membrane to a corresponding portion of said internal edge of said planar body by said joining medium having a thickness which is not greater than maximum thickness "T," whereby said membrane can pivotally move about a transverse axis, which is coplanar with said body, near said first end when installed between said cylinder block and said valve head.

2. The method of claim 1, wherein said opening is polygonal.

3. The method of claim 2, wherein said body and said membrane are different materials.

4. The method of claim 1, further including the step of providing an exhaust opening and an alignment opening in said body.

5. The method of claim 1, further including the step of rounding said peripheral edge of said membrane.

6. The method of claim 1, wherein said joining medium is an adhesive material.

7. The method of claim 1, wherein said flowing step is caused by laser welding said portion of said peripheral edge of said membrane to said corresponding portion of said internal edge of said planar body near said first end.

8. The method of claim 1, wherein said flowing step is caused by welding said portion of said peripheral edge of said membrane to said corresponding portion of said internal edge near of said planar body said first end.

9. The method of claim 1, wherein said flowing step is caused by soldering said portion of said peripheral edge of said membrane to said corresponding portion of said internal edge of said planar body near said first end.

10. The method of claim 1, wherein said flowing step is caused by brazing said portion of said peripheral edge of said membrane to said corresponding portion of said internal edge of said planar body near said first end.

11. A membrane valve for installation between mating surfaces of a cylinder block and a valve head of a compressor for creating a uni-directional flow of fluids through said compressor, comprising:

a planar body of maximum thickness "T" having an opening defining a continuous internal edge, said opening having first and second opposite ends and a longitudinal axis thereof extending between said first and second ends, a planar membrane also having a maximum thickness "T" and a peripheral edge corresponding to said continuous internal edge of said planar body, said planar membrane positioned within said opening of said planar body in a coplanar relationship with said body such that said peripheral edge of said planar membrane and said continuous internal edge of said planar body define a peripheral gap therebetween, and a joining medium extending across said gap between a portion of said peripheral edge of said planar membrane and a corresponding portion of said internal edge of said planar body near said first end at a thickness no greater than said maximum thickness "T," whereby said membrane can pivotally move about a transverse axis, which is coplanar with said body near said first end when s aid body is secured between said cylinder block and said valve head.

12. The membrane valve of claim 11, wherein said opening is polygonal.

13. The membrane valve of claim 12, wherein said body and said membrane are dissimilar materials.

14. The membrane valve of claim 13, further including said body having an exhaust opening and an alignment opening.

15. The membrane valve of claim 14, wherein said peripheral edge of said membrane is rounded.

16. The membrane valve of claim 11, wherein said joining medium is selected from the group consisting of a) adhesive, b) brazed material, c) solder, d) weld, and e) fused material.

17. In a hermetic type compressor having a cylinder block containing a cylinder opening to a flat block mating surface; a valve head with valving passages opening to a flat head mating surface and a membrane valve interposed in sealing relationship between the flat mating surfaces of the cylinder block and valve head for allowing uni-directional fluid flow between the valve passages and the cylinder, the improvement comprising:

the membrane valve having a body portion of a set thickness and a reed portion of the same thickness as the body portion, the body portion and reed portion being of dissimilar materials;

the body portion having a reed opening defining a continuous internal edge, the reed opening extending along a longitudinal axis and terminating at first and second opposite ends on the longitudinal axis;

the reed portion within said reed opening and having a peripheral edge spaced from the reed opening to define a gap therebetween, the gap being substantially uniform about a portion of the reed opening encompassing the second end; and, a joining medium within a portion of the gap at the first end securing the reed portion to the body portion, the joining medium having a thickness less than the thickness of the reed and body portions whereby said body portion can effectively seal the cylinder block with the valve head while permitting the reed portion to pivot about said first end of said reed opening for valving fluid therebetween.

18. The improvement of claim 17, wherein said opening is polygonal.

19. The improvement of claim 18, further including said body having an exhaust opening in said body and an alignment opening.

20. The improvement of claim 19, wherein said joining medium is selected from the group consisting of a) adhesive, b) brazed material, c) solder, d) weld, and e) fused material.

* * * * *